Patented Oct. 12, 1954

2,691,564

UNITED STATES PATENT OFFICE 2,691,564

METHOD OF STAINING AND FILLING WOOD

Orion William Berglund, Dayton, Ohio, assignor to Chadeloid Corporation, Dayton, Ohio, a corporation of Delaware No Drawing. Original application June 16, 1950, Serial No. 168,664. Divided and this application May 21, 1951, Serial No. 229,293

3 Claims. (Cl. 8—6.5)

This invention relates to wood finishing. More particularly, it relates to a method of staining and filling wood. Still more particularly, it relates to compositions which are adaptable to perform one or more of the functions of filling the pores and staining the wood preparatory to application of finish coatings.

This application is a division of Orion William Berglund application, Serial No. 168,664, filed June 16, 1950, now Patent No. 2,674,538.

The conventional fillers suffer from many disadvantages. After most of the filler are applied the wood surface must be dried for at least 12 hours before the surface can be sanded and a sanding sealer applied.

Another disadvantage is the softening of the filler coat by solvents contained in the overlaid lacquer coats, which results in a tendency for the coating to suck-in the wood pores upon drying.

Another disadvantage of prior commercial stain fillers is that an oil vehicle is utilized. This oil is deposited on the surface of the wood in a thin film which does not dry readily. This film is still present when the lacquer is applied and tends to retard the drying and softens the lacquer film, which in turn slows down finishing operations.

It is an object of the present invention to overcome the disadvantages and difficulties associated with the above described stain fillers.

It is another object of the present invention to provide neutral filler compositions which seal the wood pores, thereby eliminating the necessity for a sanding sealer.

It is a further object of this invention to produce a neutral filler paste which may be converted to a stain filler by addition of dye solution whose solvents are compatible with solvents in the paste.

It is a further object of this invention to produce a filler or a stain filler that is not readily softened by solvents and thinners contained in overlaid coatings.

It is still another object to provide a stain filler whose wood pore fillings do not have a tendency to shrink and to suck-in upon drying.

A still further object of this invention is to produce a stain filler with a markedly reduced tendency toward retention of solvents in the filling, a tendency which causes pin-holing in lacquer films overlaying such filler material.

A further object of this invention is to provide a stain filler having a new combination of vehicles which deposits a tough hard mass in the wood pores which is not greatly affected when lacquer comes in contact therewith.

Still another object of the present invention is to provide a method of finishing wood wherein the stain-filling operation may be performed in one step and the wood prepared for lacquer spraying in less than ten minutes.

Still further objects and advantages of this invention will appear to those skilled in the art as the description proceeds.

In carrying out the objects of this invention, a coating composition is prepared which is a neutral filler paste comprising shellac which has been rendered wax and rosin free, an alcohol solvent for said shellac, a natural gum for use as drying modifier and inert filler.

Shellac, as binder for the inerts and other components, exhibits excellent air drying, which is so essential to a stain filler. However, alone shellac is too fast drying. To modify the drying characteristics of shellac which impairs the wiping qualities of the coating composition, it is necessary to add small amounts of fossil or semi-fossil type gums.

The modifying gums are generally added as a high solids content butanol solution. Useful gums of this type are Batu, Congo elemi, kauri, mastic, pontianak, Manila, sandarac, and the like.

Solvents useful in this composition which have solvent power for shellac and gum as well as for the acid dyestuffs are the Carbitols, for example, diethylene glycol monoethyl ether, monobutyl ether, the cello-solves such as ethylene glycol monoethyl ether, ethylene glycol monoethyl ether, monobutyl ether, tetrahydrafurfuryl alcohol, and equivalent alcohols.

Additional solvents useful in various solvent combinations are, the alkyl alcohols such as ethyl, propyl, and butyl alcohols, the amino alcohols, such as methyl amino propanol, ethyl amino butanol, cyclic alcohols such as furfuryl alcohol, cyclohexanol in mixture with each other or in mixtures with volatile alcohols.

These volatile alcohols are usually added in the form of a thinner mixture often composed of aromatic hydrocarbon, such as toluol, xylol, aromatic naphthas and alcohol, but more often consisting simply of aliphatic alcohols, such as ethanol, propanol, butanol, amyl alcohol, and so forth. A minor proportion of esters of said aliphatic alcohols, such as ethyl acetate, propyl acetate and the like, may sometimes be added to the thinner.

To convert the neutral filler paste to a stain filler, there need merely be added a concentrated dye solution, the solvent for the dye being compatible with the alcohol solvent for the shellac.

The preferred solvent for dye solution is a Carbitol such as was mentioned hereinbefore or a mixture of a Carbitol with a Cellosolve, for example, diethylene glycol monomethyl ether and ethylene glycol monomethyl ether.

All acid organic dyestuffs are operative for the process and the product of this invention. Thus, for example, the following dyestuffs may be utilized: Buffalo Black NBR Conc. 126%, Black Stain B34951, Nigrosine 4523J Conc. Powder; the following yellow dyestuffs: Fast Wool Yellow 3 GL Conc. 125%, Fast Light Yellow 3G Ex. Conc., Fast Light Yellow D3GA; the following orange-yellow dyestuffs; Metanil Yellow 1955, Calcocid Yellow MXXX Conc.; the following orange dyestuffs: Fast Light Orange 2G, Fast Light Orange GA Conc.; the following red dyestuffs: Azo Rubine Ex. Conc. 133%, Calcocid Milling Red 7B Conc., Camoisine BA Extra Conc. C. F., Chromolan Bordeaux R. Croceine Scarlet MOO.

As filler materials, the following substances were found to be operative: silene, which is a hydrated precipitated calcium silicate; silex, which is a silica; calcium carbonate; diatomaceous earth; bentonite, asbestine; clay, talc, and the like.

Certain of the fillers, such as silene and silex, are preferred because they can be used without darkening pigments and thereby impart a clearness and transparency to the coating composition. Further, they enhance the natural brilliance of the wood.

The separate neutral paste and dye compositions of this invention are prepared by simply mixing the ingredients together. Preferably the dye or dyes are wetted with methanol, butanol, or a glycol ether, in an agitator, such as a pony mixer.

To the wetted dye mixture is added a solvent such as diethylene glycol monoethyl ether and the mixture agitated until all the dye is dissolved.

A neutral paste composition is prepared by first dissolving shellac in, for example, butanol, and secondly dissolving a desired quantity of gum in butanol. The solutions are mixed and then lastly the fillers are added.

If a stain filler is desired, the neutral paste and dye solution are mixed together as in a pony mixer. The mixing method provides a simple and inexpensive method of manufacture, saves grinding time, and eliminates the use of expensive ball mills.

After thorough mixing, the composition is ready to be diluted to the desired consistency for brushing or spraying onto a wood surface.

After the neutral filler or the stain filler has been applied to the wood, the excess material is removed by padding or wiping which is standard stain filler practice.

The stain filler composition of this invention may be air dried in approximately eight minutes after wiping and then sprayed with lacquer. The lacquer coat is dried 30 to 60 minutes as desired before sanding and finishing to suit the operator.

Operations with the compositions of this invention may be speeded up by force drying. For example, the stain filler may be force dried for five minutes at 120 to 140° F. immediately after it is wiped. It is then cooled for at least five minutes before applying the sealer coat. After sanding the dry sealer coat the lacquer coat may be applied.

The lacquer coat is air dried for a period of four to five minutes and the coated wood returned to the same oven for approximately ten minutes. Upon its removal from the oven it is cooled for at least five minutes before sanding and then applying the next lacquer coat.

By use of force drying throughout the entire finishing process, the rubbing operation with rotten stone, oil, pumice, or other types of rubbing compounds, may be performed 30 minutes after drying of final lacquer coat.

The quantities of basic constituents may be varied within reasonable limits depending upon the specific formulation desired. In general, it may be stated that a formulation including ethylene glycol monomethyl ether may have the ether and any companion alcohols which form a dye solvent vary from 5 to 50 parts alcohol, 5 to 100 parts ethylene glycol monomethyl ether.

In formulations involving diethylene glycol monomethyl ether, the ether may be varied from 1 to 100 parts, and where tetrahydrafurfuryl alcohol is utilized instead of a Carbitol or a Cellosolve, it may be varied from 5 to 100 parts.

The dye may constitute from 1 to 50 parts or more of the dye-solvent solution, depending upon the amount of inerts which will be added at a later step.

The shellac which is normally used in the form of a 50% alcohol solution may be varied from 5 to 100 parts or more, depending upon the amount of inerts used.

The fossil gum may be varied from 1 to 50 parts or more of the composition.

Polyvinyl alcohol, the preferred thickening agent, may be varied from 5 to 50 parts by weight.

Inasmuch, as inerts cover a wide range of material, a specific proportion is very indefinite but, in general, it may be stated that the inerts may vary from 10 to 100 parts by weight.

When a thinner mixture made up of toluol, high flash naphtha (a coaltar derivative) and butanol, the butanol may constitute 5 to 75 parts of the mixture. The toluol and naphtha may be varied from 5 to 50 parts by weight.

In general, it is preferred to use a mixture of which toluol constitutes at least 50%.

In the following examples a few embodiments of the invention are illustrated, without intending thereby to limit the invention thereto:

A typical example of a neutral filler composition comprising shellac is:

| | |
|---|---|
| 372 gms. (550 cc.) | Butanol |
| 685.0 gms. {50% / 50%} | Refined shellac [1] / Denatured alcohol |
| 30.0 gms. {50% / 50%} | Manila gum / Butanol |
| 2100.0 gms. | Silica (silex) less than 44 microns in size |
| 870.0 gms. | Talc |

[1] Wax and rosin free centrifuged.

In preparing this neutral filler, shellac solution is poured into a pony mixer. The shellac solution is thinned by addition of the butanol.

After 5 minutes stirring the Manila gum solution is added and the combination stirred for 2 minutes. The inert filler is then added, with preferably the silica being added first.

In making a stain filler, there is added to the above neutral filler about 3 to 10% of a dye concentrate.

Dye concentrates for this purpose are as follows:

(A) Dye concentrate black
16 gms. Buffalo black NBR—126%
22 gms. methyl Carbitol
113 gms. methyl Cellosolve (B) Dye concentrate scarlet
16 gms. azo Rubino dye
22 gms. methyl Carbitol
113 gms. methyl Cellosolve (C) Dye concentrate orange
16 gms. orange 2 Y A
22 gms. methyl Carbitol
113 gms. methyl Cellosolve For preparing, for example, a red mahogany stain filler, various proportions of neutral filler (1) and dye concentrates (A), (B) and (C) may be combined depending upon the type of wood to be treated and the depth of color sought.

A typical composition comprises:

185 gms. of neutral filler (1)
1 gm. of dye concentrate (A)
6.5 gms. of dye concentrate (B)
7.5 gms. of dye concentrate (C)

This concentrated stain filler may be prepared for use by thinning 8 to 10 lbs. of the mixture with 1 gallon of diluents.

A typical stain filler ready for spraying will have the following composition:

185 gms. neutral stain filler paste
15 gms. dye concentrates
90 cc. butanol
60 cc. toluol
50 cc. high flash naphtha It will, of course, be understood that the color concentrates are not limited to black, scarlet and orange. Other concentrates such as brown, yellow, purple, and the like, may be prepared for blending to meet any desired shading.

The thinner composition is also subject to considerable variation. Butanol may constitute 20–50% of the thinner, while toluol and high flash naphtha are usually maintained in a ratio of 1 of toluol to 1 to 1.6 of naphtha.

It will be understood that while there have been given herein specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. A method of staining and filling wood which comprises the steps of applying thereto a staining and filling composition consisting of the following ingredients in the approximate proportions by weight: 372 parts butanol, 685 parts shellac dissolved in ethyl alcohol, 30 parts Manila gum dissolved in butanol, 2100 parts silica, said silica having a particle size of less than 44 microns, 870 parts of talc, and a dye concentrate comprising an organic acid dyestuff dissolved in a mixture of ethylene glycol monomethyl ether and diethylene glycol monomethyl ether, the said dye concentrate comprising from 3 to 10% by weight of said filler, mechanically removing excess stain and filling composition from the wood surface after application of said composition thereto.

2. A method of staining and filling wood which comprises the steps of applying thereto a staining and filling composition consisting of the following ingredients in the approximate proportions by weight: 372 parts butanol, 685 parts shellac dissolved in ethyl alcohol, 30 parts Manila gum dissolved in butanol, 2100 parts silica, said silica having a particle size of less than 44 microns, 870 parts of talc, and a dye concentrate comprising an organic acid dyestuff dissolved in a mixture of ethylene glycol monomethyl ether and diethylene glycol monomethyl ether, the said dye concentrate comprising from 3 to 10% by weight of said filler, mechanically removing excess stain and filling composition from the wood surface after application of said composition thereto, force air-drying the stain-filled wood at a temperature of between about 120 and 140° F. and applying a lacquer coating to the stain-filled wood.

3. The method of staining and filling wood which comprises the steps of applying thereto a staining and filling composition consisting of the following ingredients in the approximate proportions by weight: 372 parts butanol, 685 parts shellac dissolved in ethyl alcohol, 30 parts Manila gum dissolved in butanol, 2100 parts silica, said silica having a particle size of less than 44 microns, 870 parts of talc, and a dye concentrate comprising an organic acid dyestuff dissolved in a mixture of ethylene glycol monomethyl ether and diethylene glycol monomethyl ether, the said dye concentrate comprising from 3 to 10% by weight of said filler, removing excess stain and filling composition from the wood surface after application of said composition thereto by mechanically wiping the surface, sanding the treated wood surface and applying a lacquer coating thereover.

References Cited in the file of this patent

UNITED STATES PATENTS

| Number | Name | Date |
| --- | --- | --- |
| 1,969,636 | Alden | Aug. 7, 1934 |
| 2,000,121 | Bush | May 7, 1935 |
| 2,085,170 | Rankin | June 29, 1937 |
| 2,161,503 | Bush | June 6, 1939 |